United States Patent
Cowley et al.

[11] Patent Number: 5,965,004
[45] Date of Patent: *Oct. 12, 1999

[54] CHLORINE DIOXIDE GENERATION FOR WATER TREATMENT

[75] Inventors: Gerald Cowley, Mississauga; Marek Lipsztajn, Etobicoke; George Joseph Ranger, Mississauga; Ron K. Schaible, Mississauga; Ty V. Tran, Mississauga; Darren F. Lawless, Oakville, all of Canada

[73] Assignee: Sterling Pulp Chemicals, Ltd., Islington, Canada

[*] Notice: This patent is subject to a terminal disclaimer.

[21] Appl. No.: 08/959,031

[22] Filed: Oct. 28, 1997

Related U.S. Application Data

[63] Continuation-in-part of application No. 08/545,792, Mar. 13, 1996, abandoned.

[51] Int. Cl.[6] .................................................... C25B 1/00
[52] U.S. Cl. ...................... 205/499; 205/502; 205/503; 205/556; 423/478; 210/638; 210/640
[58] Field of Search .................... 205/499, 502, 205/503, 556; 423/478; 210/638, 640

[56] References Cited

U.S. PATENT DOCUMENTS

| | | |
|---|---|---|
| 2,163,793 | 6/1939 | Logan . |
| 2,717,237 | 9/1955 | Rempel . |
| 3,871,228 | 3/1975 | Weiss . |
| 4,542,008 | 9/1985 | Capuano et al. . |
| 4,683,039 | 7/1987 | Twardowski et al. . |
| 4,767,510 | 8/1988 | Lipsztajn . |
| 4,769,742 | 9/1988 | Nakajima et al. . |
| 4,798,715 | 1/1989 | Hardee et al. . |
| 5,084,149 | 1/1992 | Kaczur et al. . |
| 5,122,240 | 6/1992 | Cowley et al. . |
| 5,158,658 | 10/1992 | Cawlfield et al. . |
| 5,174,868 | 12/1992 | Lipsztajn et al. . |
| 5,284,553 | 2/1994 | Lipsztajn et al. . |
| 5,290,405 | 3/1994 | Joshi et al. . |
| 5,298,280 | 3/1994 | Kaczur et al. . |
| 5,523,072 | 6/1996 | Falgén et al. ........................ 205/556 |

FOREIGN PATENT DOCUMENTS

| | | |
|---|---|---|
| 0158798 | 10/1985 | European Pat. Off. . |
| 0230737 | 9/1989 | European Pat. Off. . |
| 0343122 | 11/1992 | European Pat. Off. . |
| WO 90/10733 | 9/1990 | WIPO . |
| WO 91/09158 | 6/1991 | WIPO . |
| WO 91/09990 | 7/1991 | WIPO . |
| WO 92/03374 | 3/1992 | WIPO . |
| WO 92/13365 | 8/1992 | WIPO . |

*Primary Examiner*—Arun S. Phasge
*Attorney, Agent, or Firm*—Sim & McBurney

[57] ABSTRACT

Chlorine dioxide is generated by electrochemical oxidation of sodium chlorite in an anode compartment of a cation-exchange membrane-divided cell in the presence of significant quantities of sodium chlorate and is recovered in a suitable recipient medium by passing the chlorine dioxide through a hydrophobic microporous membrane. Water balance in a continuous operation is maintained by removing water from the anolyte by transporting the same partly across the hydrophobic microporous membrane in vapor form and partly across the cation-exchange membrane.

7 Claims, 1 Drawing Sheet

CHLORINE DIOXIDE GENERATION FOR WATER TREATMENT

REFERENCE TO RELATED APPLICATIONS

This application is a continuation-in-part of U.S. patent application Ser. No. 08/545,792 filed Mar. 13, 1996, now abandoned.

FIELD OF INVENTION

The present invention relates to an environmentally-friendly, continuous process for the production of chlorine dioxide for water treatment applications in a very pure form, substantially free from contaminants, such as chlorine, chlorite, chlorate and chloride.

BACKGROUND TO THE INVENTION

In U.S. Pat. No. 4,683,039, assigned to Sterling Canada, Inc. and the disclosure of which is incorporated herein by reference, there is described the production of chlorine dioxide and its separation using gas membranes, i.e. microporous hydrophobic membranes which permit gas or vapor of chlorine dioxide to pass therethrough but resist the passage of liquid and ions therethrough.

U.S. Pat. No. 2,163,793 describes an electrochemical chlorine dioxide generating process in which a mixture of alkali metal chlorite and alkali metal chloride is electrolyzed in an electrolytic cell equipped with a porous diaphragm separating the anode and the cathode compartments.

British Patent No. 714,828 describes a process for the production of chlorine dioxide by electrolysing an aqueous solution containing chlorite and a water soluble salt of an inorganic oxy-acid other than sulfuric acid while U.S. Pat. No. 2,717,237 discloses a method for producing chlorine dioxide by electrolysis of chlorite in the presence of sulfate ions.

Japanese Patent Publication No. 81-158883, published Dec. 7, 1981, describes an electrolytic process for producing chlorine dioxide by electrolysis of chlorite in which the electrolysed solution, at a pH of 2 or less, is fed to a stripping tank where air is introduced to recover the chlorine dioxide.

U.S. Pat. No. 4,542,008 describes an electrolytic process for chlorine dioxide production in which the sodium chlorite concentration in the anolyte is monitored and controlled by means of a photometric cell.

Published International patent application WO 91/09158 discloses a method of producing chlorine dioxide from chlorite in an ion exchange compartment of a multi-compartment cell in which hydrogen ions generated in the anode compartment enter the ion exchange compartment through a cation exchange membrane, causing chlorite ions decomposition to form chlorine dioxide and other by-products.

Published International patent application WO 91/09990 teaches an electrochemical process for producing chlorine dioxide from dilute alkali metal chlorite solution in a single pass mode using a porous flow-through anode in which the unconverted chlorite together with other components of the anolyte constitute an effluent.

A disadvantage of all of the above described electrolytic processes for the production of chlorine dioxide is that they are not suitable for a highly efficient, continuous, effluent-free operation in which all the components of the chlorite feed are safely and very efficiently removed with formation of an essentially pure chlorine dioxide, whereby no undesired or harmful by-products or contaminants are generated or accumulated.

SUMMARY OF INVENTION

In the present invention, there is employed a combination of highly efficient electrochemical oxidation of sodium chlorite to chlorine dioxide and membrane separation of the chlorine dioxide so produced in the continuous production of chlorine dioxide. In one embodiment of the present invention, there is provided a method for the production of an aqueous solution of chlorine dioxide, which comprises electrochemically generating chlorine dioxide from an aqueous solution of sodium chlorite and recovering the chlorine dioxide so produced by passing the chlorine dioxide through a hydrophobic, microporous membrane to a recipient medium.

Accordingly, in one aspect of the present invention, there is provided a method of forming an aqueous solution of chlorine dioxide, which comprises feeding an aqueous solution of sodium chlorite to an anodic compartment of an electrochemical cell divided by at least one ion-permeable separator from a cathode compartment to which water or an aqueous electrolyte is fed; electrochemically generating a first aqueous solution of chlorine dioxide in the anodic compartment of the electrochemical cell in the presence of about 20 to about 450 gpL of sodium chlorate; contacting the aqueous solution of chlorine dioxide with one face of a hydrophobic microporous membrane; and providing a differential of partial pressure of both the chlorine dioxide and water vapor between the aqueous solution and an aqueous recipient medium in contact with the opposite face of the hydrophobic microporous membrane, whereby both chlorine dioxide and water vapor pass through the membrane to the recipient medium to form a second aqueous solution of chlorine dioxide as the product.

GENERAL DESCRIPTION OF INVENTION

Figure 1:
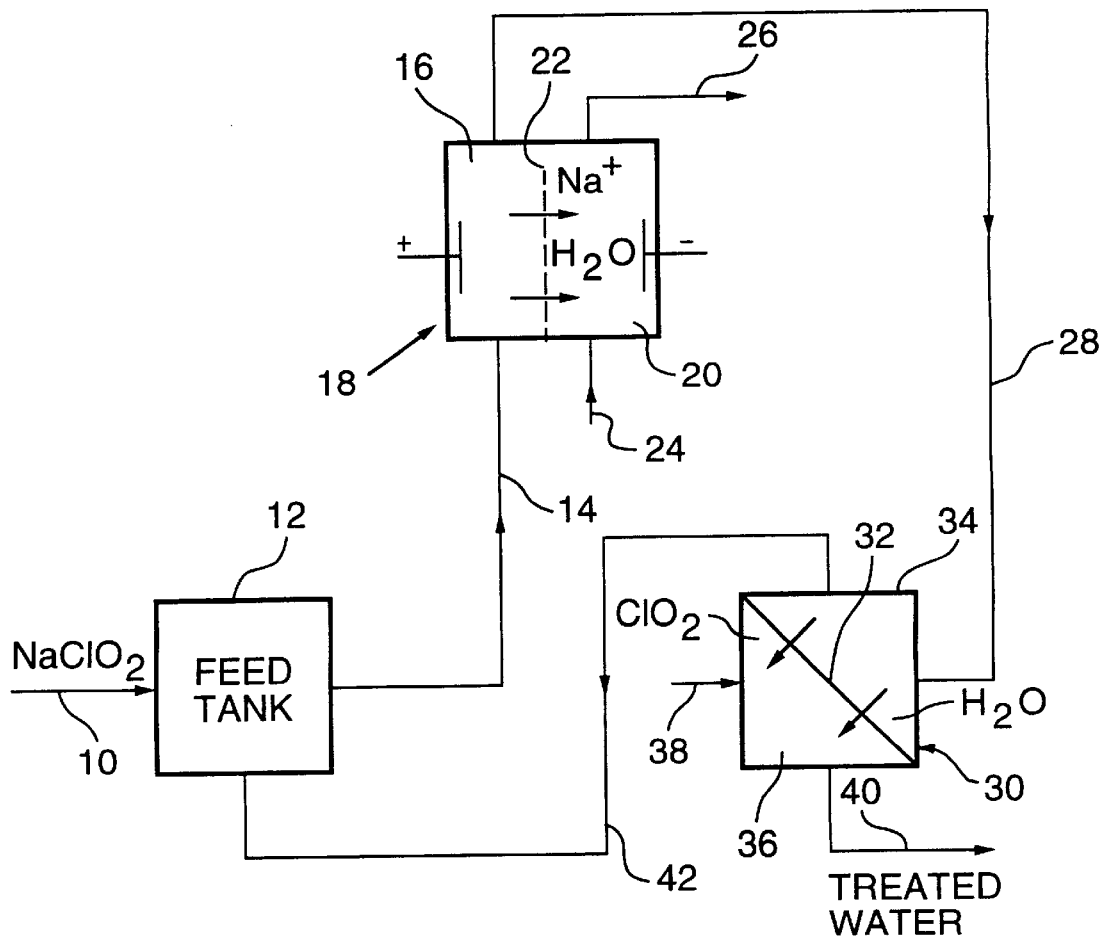
FIG. 1 is a schematic flow sheet of a chlorine dioxide generation and utilization process provided in accordance with one embodiment of the invention.

Electrochemical production of chlorine dioxide is effected in an electrochemical cell, divided by an ion-permeable separator, generally a cation-exchange membrane, into an anode compartment and a cathode compartment. The electrochemical reaction to form chlorine dioxide is effected in the anode compartment of the cell from a feed thereto of an aqueous solution of alkali metal chlorite, usually sodium chlorite. A suitable aqueous electrolyte is provided to the cathode compartment. Chlorine dioxide and water vapor are transferred to the recipient medium through a hydrophobic microporous membrane.

The production of chlorine dioxide from sodium chlorite by electrochemical oxidation in the anode compartment in accordance with the equation:

$$NaClO_2 \rightarrow ClO_2 e + Na^+ \qquad (1)$$

enables highly efficient production of chlorine dioxide to be achieved, essentially uncontaminated with chlorine. The use of a gas membrane process (or pervaporation as it is termed in the above-noted U.S. patent) enables highly pure chlorine dioxide to be recovered from the cell liquor and transferred to a recipient medium, as desired.

An efficient chlorite oxidation process preferably is carried out at approximately neutral pH. Since the typical technical product which can be used as a feed to the chlorine dioxide generation system, for example, about 37 wt % sodium chlorite solution, usually contains some sodium hydroxide and/or carbonate/bicarbonate as a stabilizer, it is beneficial to adjust the pH of the sodium chlorite feed accordingly.

Another source of hydroxide ions that can be present in the anolyte is the so-called "backmigration" of hydroxyl ions originating in the cathode compartment of the electrochemical cell employed to effect reaction (1) and entering the anolyte through the cation exchange membrane or another ion-permeable separator. While a cation exchange membrane is, in principle, permeable only to cations, its anion rejection characteristics is usually not perfect, thus allowing a limited quantities of anions, such as hydroxyl ions to penetrate to the anode compartment. Some cation exchange materials are known to have a better anion rejection characteristics than others but in general a certain degree of hydroxyl ions backmigration can be anticipated. It is known, for example, that cation exchange membranes based on the composite of perfluorinated carboxylic and sulfonic cation exchange copolymers have a better selectivity than the polymers equipped with sulfonic groups only. The former membranes, however, are much more sensitive to the presence of impurities, such as hardness forming ions, than the latter membranes.

The anion rejection characteristics of the cation exchange material is important, not only from the viewpoint of the minimization of the hydroxyl ion backmigration to the anolyte but also with regard to potential contamination of the catholyte by the anionic species present in the anolyte, such as chlorite ions. The backmigration of hydroxyl ions to the anolyte may also be influenced by the concentration of such ions in the catholyte.

The presence of excess alkali in the anolyte may lead to a well-known chlorine dioxide disproportionation reaction and should be avoided. A pH adjustment of the anolyte may be made by any convenient method, including an electrochemical method.

Such electrochemical method is based on the occurrence of the oxygen evolution reaction at the anode:

$$2H_2O \rightarrow O_2 + 4H^+ + 4e \qquad (2)$$

in addition to the primary electrode reaction depicted by equation (1).

Since reaction (1) is thermodynamically more favourable than reaction (2), one possible method of enabling the occurrence of reaction (2) is to impose an anodic current density which cannot be fully sustained by reaction (1), i.e. by operating the process at a current density exceeding that corresponding to a mass transport limitation of reaction (1). The mass transport limitation of electrode reaction (1) is believed to be a function of such factors as chlorite ion concentration, anolyte composition, flow rate (velocity), presence of turbulence, temperature and anolyte viscosity.

Relative contributions of reactions (1) and (2) to the overall current can also be modified, for example, by the pH of the anolyte and by the selection of the anode material. It is known that certain oxygen evolving anodes, such as DSA-$O_2$® anodes (trademark of ELTECH CORP.), are characterized by a lower oxygen evolution overpotential than other anode materials, such as, for example, graphite, thus facilitating the occurrence of reaction (2). The oxygen evolution characteristic of the anode is one of many factors to be considered for proper selection of the anode material. Other factors are, for example, the anode effects on the decomposition of chlorite ions and chlorine dioxide. Anode material facilitating such decomposition or oxidation of chlorine dioxide to chlorate ions should be avoided. When using a plurality of electrochemical cells it is possible to combine cells equipped with anodes made from different electrode materials. For example, some cells may be equipped with anodes promoting reaction (2), such as DSA-$O_2$® anodes, while other with anodes enabling a highly efficient (i.e. with no undesired by-product formation) reaction (1), such as graphite, which, on the other hand, may not be sufficiently stable under conditions of oxygen evolution reaction (2). The current density imposed may differ for different anode materials serving different objectives in the multi-cell assembly. For example, if oxygen evolution is to be avoided on graphite anodes, the current density on such anodes should not exceed that governed by mass transport limitations of reaction (1). It is also possible to employ anodes subdivided into sectors made from different materials. The costs of the anode material should also be considered during optimization.

There are numerous anode materials in various shapes and forms which may be considered for the proper balancing of reactions (1) and (2). Typical anode materials include not only above mentioned graphite (or any other carbon material, such as glassy carbon) and DSA-$O_2$® but also lead dioxide, platinum or other noble metal (both taken alone as well as connected to a suitable substrate), ruthenium dioxide on titanium (known e.g. as DSA-$Cl_2$®—Trademark of ELTECH CORP.), platinum/iridium on titanium, for example. The effective surface of the anodes may be enhanced, if required, by utilizing their three-dimensional structures, the latter being particularly useful for generation of chlorine dioxide from dilute anolyte streams. A method of preparing such structures has recently been described in U.S. Pat. No. 5,298,280.

The flow pattern within the high surface area anode may be optimized in order to improve the process efficiency. It is usually beneficial to minimize the residence time of chlorine dioxide enriched anolyte within the cavity between the cation exchange membrane and the high surface area structure. Therefore, it is preferred to operate the cell in a so-called flow-through mode, most preferably with the anolyte entering the cell close to the cation exchange membrane, passing through the high surface area anode/perforated current collector (current feeder) assembly and exiting behind the high surface area anode/perforated current collector assembly.

A flow-by anolyte flow pattern, such as that described in the U.S. Pat. No. 5,158,658, may also be employed, if desired. In the latter case, it is beneficial to avoid direct contact between the high surface area structure and the cation exchange membrane. It is believed that such contact may enhance the undesirable backmigration of hydroxyl ions to the anode compartment. A spacer mode from any suitable plastic or other inert material can be placed between the high surface area anode and the cation exchange membrane in order to minimize such a contact.

The extent to which reaction (2) is permitted to occur may be calculated based on the overall input of hydroxyl ions to the anolyte. Thus, for example, a more pronounced hydroxyl ions backmigration from the catholyte (resulting, for example, from a higher concentration of hydroxyl ions in the catholyte) would usually require, but not always, a higher anodic current density in order to increase the contribution of reaction (2).

It is possible to employ a pH measurement in the anolyte as a feedback for the adjustment of current density. At a given anolyte composition (in terms of chlorite concentration) and for a given flow conditions, an upward trend of pH would trigger, in such case, an increased current density by either increasing the overall current at a given overall surface area of the anodes or, if an approximately constant production rate of chlorine dioxide is desired, the current may be maintained at a constant level while the overall surface area of the anodes is decreased (by, for example, switching off anolyte flow to the part of electrochemical cells comprising a multi-cell assembly). Alternatively, a feedback originating from the pH measurement of the anolyte may also lead to an automatic or manual adjustment of the anolyte composition (chlorite concentration), flow conditions, temperature etc. Similarly, a downward trend in pH may automatically trigger the required adjustments in current density, chlorite concentration, flow conditions, temperature etc.

It is believed that lasting excursions of the anolyte pH to the acidic range may result in a decomposition of chlorite ions leading to the formation, in addition to chlorine dioxide, of at least one of the following impurities, namely chloride ions, chlorate ions and chlorine. Chlorine may originate, for example, from a secondary reaction involving electrooxidation of chloride ions at the anode. Such reaction may not be entirely undesired since chlorine is known to react rapidly with chlorite ions to form chlorine dioxide and chloride ions. Chlorine evolution characteristics of the anode is yet another factor to be considered for the proper anode selection. Such excursions, therefore, should generally be avoided.

It is further believed that small, temporary excursions from the optimum pH of about 7 of the anolyte to either alkaline or acidic range are generally acceptable. The impact of such excursions is a function of such factors as chlorite concentration, chlorine dioxide concentration, temperature, time, etc. For example, the higher the chlorine dioxide concentration, the more pronounced would be its decomposition during pH excursions to the alkaline pH range. In fact, the disproportionation reaction of chlorine dioxide to chlorate and chlorite ions, which is known to occur rapidly in the alkaline medium may also occur in the acidic medium, albeit at a lower rate. It is possible that in order to minimize the occurrence of this particular reaction, the optimum pH of significantly lower than 7, preferably in the range of about 3 to about 6 may be required. The extent to which the optimum pH deviates from 7 will be dependent on various process conditions, such as chlorine dioxide concentration, chlorite concentration, temperature, residence time, flow rate, etc. The excursions to the slightly acidic pH range are believed to be generally more acceptable than those to the alkaline pH range. It has been reported in the literature that the occurrence of the undesired electrooxidation reaction of chlorine dioxide to chlorate can be minimized by maintaining the pH of the anolyte in the slightly acidic range.

Since hydroxyl ions originating from the catholyte and entering the anolyte through the cation exchange membrane as a result of the backmigration may create a strongly alkaline boundary layer on the surface of the membrane facing the anode and since the compensating (neutralization) reaction producing hydrogen ions (reaction 2) takes place at the anode, which may create a strongly acidic boundary layer in the proximity of the anode which is located at a certain, finite distance from the alkaline boundary layer, it may be beneficial to create conditions facilitating the neutralization reaction between the hydroxyl and hydrogen ions in order to minimize the occurrence of possible undesired reactions involving, for example, chlorite ions in a localized acidic medium or chlorine dioxide in a localized alkaline medium. It is possible, for example, to improve the mixing within the anode compartment by improving the flow characteristics and employing turbulence promoters. Any suitable pH buffer, such as phosphate buffer, phthalate buffer, acetate buffer, citrate buffer or a combination thereof, may be employed in order to moderate the pH changes within the anodic compartment. Such buffer should be characterized by a sufficient buffering capacity in terms of its ability to "absorb" hydroxyl ions and hydrogen ions without introducing any kinetic limitations on the neutralization process. More concentrated buffers are generally known to have higher buffering capacity. The effect of an alkaline boundary layer in the proximity of the surface of the cation exchange membrane facing the anode can also be minimized by employing a slightly acidic anolyte, if desired.

Accordingly, in a further aspect of the invention, there is provided an electrochemical process in an anode compartment of an electrochemical cell divided by at least one ion-permeable separator from a cathode compartment, which comprises feeding a first electrolyte to the anode compartment and effecting electrolysis of the electrolyte to form hydrogen ions; feeding a second electrolyte to the cathode compartment and effecting electrolysis of the electrolyte to form hydroxyl ions, at least some of the hydroxyl ions backmigrating across the at least one ion-permeable separator into the anode compartment; and providing a buffer in the anode compartment to neutralize both the electrochemically-produced hydrogen ions and the back-migrating hydroxyl ions as well as the hydroxyl ions which may be introduced to the anode compartment with the first electrolyte feed.

While reaction (2) is a preferred reaction generating the necessary hydrogen ions required for the neutralization of hydroxyl ions entering the anolyte loop, some other electrochemical reactions may also be employed. An example of an electrochemical reaction resulting in the generation of hydrogen ions without a formation of any persistent byproducts is the electrooxidation of hydrogen peroxide.

$$H_2O_2 \rightarrow 2H^+ + 2e + O_2 \qquad (3)$$

Alternatively, metal peroxides or superoxides, preferably sodium peroxide, may be employed to substitute hydrogen peroxide in reaction (3).

There are many other reagents, in particular organic compounds, which may generate hydrogen ions during oxidation without co-production of any persistent by-products. Preferably, simple organic compounds such as methanol or other simple alcohols, aldehydes, ketones, acids or their combination can be employed whereby the electrooxidation reaction results in the formation of hydrogen ions and carbon dioxide. An example of such reaction is depicted by equation (4):

$$\text{organic compound} + \text{water} \rightarrow pCO_2 + nH^+ + me^- \qquad (4)$$

where the coefficients p, n and m are based on the stoichiometry of reaction (4).

Carbon dioxide generated in reaction (4), if not stripped from the reaction medium, may form bicarbonate or carbonate ions which could comprise a persistent impurity. Nitrogen based reagents such as ammonia, urea, hydrazine and hydroxylamine may also be employed, whereby the electrooxidation reaction preferably produces nitrogen gas and hydrogen ions.

While it is preferred to operate the process of the invention continuously without generating any undesired effluent or by-products and thus it is beneficial to employ a hydroxide neutralization method which fulfils such requirements, it is still possible to utilize a conventional acid or acid anhydride (such as sulfuric, hydrochloric or phosphoric acid or carbon dioxide, the latter being equivalent to carbonic acid) addition, especially if the build-up of persistent contaminants, such as sulfate, phosphate, bicarbonate or carbonate (or other ions, if a different acid or acid anhydride is employed), is counteracted by periodic removal of impurities by any convenient method, such as bleed-out, precipitation, chemical decomposition and membrane separation.

Such approach may be particularly acceptable when a non-continuous, batch-wise operation is employed. Any of the above mentioned methods also can be employed to counteract the build-up of impurities in a continuous operation involving a preferred, electrochemical method of hydroxyl ions neutralization. Even during such operation some of the undesired contaminants, such as chlorate ions, may be formed or may be added with the chlorite feed and hence a suitable method for the anolyte purification may be incorporated into the process, if necessary.

One possible method of destroying such undesired contaminants, for example, chlorates, is to direct a small stream of the contaminated anolyte into the cathode compartment of a cell equipped with a cathode capable of reducing chlorate to, for example, chloride. There are numerous cathode materials which are suitable for this purpose, for example, copper, tungsten, molybdenum, chromium, titanium, steel, Raney nickel etc. It is beneficial to combine such cathode compartment with the anode compartment of a chlorine dioxide generation cell. However, a separate electrochemical cell also may be utilized for this purpose.

When operating a system with two types of electrochemical cells, one type being utilized for chlorine dioxide generation (referred to herein as the chlorine dioxide generation cell) and another one effecting anolyte acidification (referred to herein as the acidification cell), it is possible to achieve at least partial decomposition of undesired by-products, such as chlorates, in the anodic compartment of the acidification cell. Typically, the anolyte from the anode compartment of the acidification cell is forwarded to the anode compartment of the chlorine dioxide generation cell.

It is preferred to effect significant accumulation of chlorate ions in the anolyte prior to subjecting them to such a partial decomposition, so that the electrochemical production of chlorine dioxide is effected in the presence of a significant concentration of sodium chlorate. A typical concentration level of chlorate in the anolyte should be in the range of about 20 grams per liter (gpL) to about 450 gpL, preferably about 50 gpL to about 250 gpL. It is preferred to direct at least a portion of chlorate enriched anolyte to the acidification cell with the acidified anolyte exiting such a cell being directed to the chlorine dioxide generation cell. It is believed that acid generated in the acidification cell may facilitate chlorate ion decomposition via several possible routes, one of them being:

$$2ClO_3^- + 2Cl^- + 4H^+ \rightarrow 2ClO_2 + Cl_2 + 2H_2O \qquad (5)$$

The by-product chlorine from the above reaction may subsequently undergo reaction with chlorite ions to produce more chlorine dioxide:

$$Cl_2 + 2ClO_2^- \rightarrow 2ClO_2 + 2Cl^- \qquad (6)$$

Should the actual acidity within the anodic compartment of the acidification cell be very high (in the order of 5 N), there is a possibility of the occurrence of yet another desired reaction:

$$ClO_3^- + ClO_2^- + 2H^+ \rightarrow 2ClO_2 + H_2O \qquad (7)$$

In addition to the above mentioned desired reactions (5 to 7), some less desirable reactions may also take place, for example:

$$5ClO_2^- + 4H^+ \rightarrow 4ClO_2 + Cl^- + 2H_2O \qquad (8)$$

While the process of the present invention operates primarily with the sodium chlorite feed, it is possible to take advantage of the occurrence of reactions (5 to 7) by feeding also chlorate ions to the system in any suitable form, for example, as chloric acid or alkali metal chlorate. Chloride ions required in reaction (5) may be replenished by feeding alkali metal chloride or, preferably, hydrochloric acid.

Optimum conditions for reaction (5) involve highest possible concentration ratio of $[ClO_3^-]$ to $[Cl^-]$.

Under most preferred conditions, the rate of chlorate removal in the acidification cell should be equal to the chlorate formation rate in the system, so that no net increase of chlorate concentration takes place.

Higher temperatures in conjunction with lower chlorite ion and chlorine dioxide concentrations may also be beneficial, subject to finding an optimum in the trade-off between the negative and positive consequences of high temperature operation.

Lower chlorite concentration, typically of less than about 0.2 M, preferably below about 0.12 M, may permit an operation at a pH significantly lower than about 5, preferably in the about 3 to about 4.5 range. Addition of catalytically active additives, such as metal ions and/or complexes of silver, manganese, palladium, may also be employed, if desired.

Since the sodium chlorite feed typically contains some sodium hydroxide as a stabilizer, it may be beneficial to move the chlorite feed addition point to a point located after the chlorine dioxide generation cell, if desired. It is also possible to employ a cell in which the cathodic destruction of the effluent from the anolyte is combined with the anodic acidification process useful for pH adjustment of the anolyte.

It is possible to combine the novel process of the present invention with a conventional chlorine dioxide generation process in such a way that the bleed-out originating from the process of the invention is cascaded to the conventional chlorine dioxide generator or, alternatively, to an electrochemical chlorine dioxide generation process of the type described in the aforementioned WO 91/09990.

Since the typical, commercially available sodium chlorite usually may contain, in addition to the previously mentioned hydroxide, small quantities of various contaminates, such as carbonate, chlorate, sulfate and chloride, which may accumulate to unacceptable levels during a prolong, continuous operation, it is beneficial to modify the sodium chlorite manufacturing process in order to produce a sufficiently pure substrate intended for use as a feed to the chlorine dioxide generation process. Alternatively, the commercially available sodium chlorite may be subjected to a suitable purification prior to being use as a feed.

While various above-described methods for pH adjustment, specifically the electrochemical method depicted by reactions (2) to (4), have been disclosed in the context of the electrooxidation of chlorite ions to chlorine dioxide, their applicability is not limited to this process only and can be extended to any electrochemical process in which the proper balancing of pH is required.

Accordingly, in another aspect of the invention, there is provided an electrochemical process in an anode compartment of an electrochemical cell divided by at least one ion-permeable separator from a cathode compartment to which an aqueous electrolyte is fed, which comprises effecting electrochemical oxidation of an aqueous salt solution in the anode compartment while transferring the cation species of the salt to the cathode compartment; and simultaneously effecting electrochemical acidification of the aqueous salt solution to effect pH constancy of the aqueous salt solution.

An analogous approach can also be applied to electroreduction reactions when the primary electrochemical reaction occurs at the cathode and when the pH balancing can be achieved by, for example, electrogeneration of hydroxyl ions at the cathode to any desired degree. Again, no persistent impurities are accumulated during such operation which is of great importance for continuous environmentally-friendly processes.

A major problem associated with operating the chlorine dioxide generation process according to the invention and depicted by equation (1) on a continuous basis is maintaining a proper water balance. For example, using a concentrated (37 wt %) sodium chlorite solution as a feed introduces water to the electrochemical cell at a mole ratio of $NaClO_2:H_2O$ of about 1:9. Under conditions of a 100% efficient sodium chlorite electrooxidation process effected in a two-compartment cell equipped with a cation-exchange membrane to produce chlorine dioxide, approximately 2 to 5 moles of water is transported through the membrane to the cathode compartment with each mole of $Na^+$ ions, which corresponds to 2 to 5 moles of water removed from the anolyte for each mole of $ClO_2$ produced. However, to maintain the proper water balance required for a continuous operation of the chlorine dioxide generation process, an additional 4 to 7 moles of water per mole of chlorine dioxide produced must be removed from the anolyte. The amount of water to be removed from the anolyte may be higher if a less concentrated feed of sodium chlorite is used. The amount of water also may be lower, for example, if crystalline sodium chlorite is employed and the amount of water fed to the system is smaller.

In accordance with the present invention, the further volume of water required to be removed is removed by a gas membrane process, similar to that used for separation of chlorine dioxide from cell liquor. While the hydrophobic microporous membrane used in this process does not allow liquid water transport, it has been found that, it is possible to transfer water through this membrane in a vapor form.

Accordingly, the chlorine dioxide-containing anolyte from the electrochemical oxidation of sodium chlorite is maintained at a positive water vapor pressure gradient with respect to the chlorine dioxide receiving solution (i.e. the water treated by the chlorine dioxide transferred from the anolyte) by employing, for example, a higher temperature of the chlorine dioxide donating solution, in order to effect transfer of water vapor through the gas membrane along with the chlorine dioxide.

The temperature differential between the donor and recipient medium to facilitate the water vapor passage may vary from about 0.1° to about 100° C., preferably about 1° to about 5° C., to facilitate the transfer of water vapor. Accordingly, the donor medium may have a temperature from about 5° to about 100° C., preferably about 15° to about 80° C. while the recipient medium may have a temperature of about 1° to about 80° C., preferably about 5° to about 40° C. A pressure differential may be used alternatively to or in conjunction with the temperature differential to provide the vapor transfer driving force.

The composition of the chlorine dioxide donating solution may affect the water vapor gradient thus influencing the effectiveness and the rate of water transfer. Other important factors to consider in this respect is the flow characteristics of both the donating and receiving solutions and their temperatures. The hardware design of the gas transfer module equipped with the gas membrane plays a very important role in ensuring a proper flow characteristics by allowing a desired flow rate (velocity) and turbulence.

The removal of water from the chlorine dioxide generator, therefore, is effected by a combination of two membranes, one a cation-exchange membrane in the electrolysis step and the other a gas membrane, to maintain continuous chlorine dioxide production for water treatment. While it is usually beneficial to employ a common gas membrane for both chlorine dioxide and water vapor transfer, it is also possible to utilize separate gas transfer modules for each of the processes, whereby membrane characteristics may be optimized according to the requirements of each process. Alternative water removal procedures may be adopted, if desired, such as membrane distillation, reverse osmosis, and evaporation. A combination of various methods may also be employed.

It is further believed that analogously to the case of water vapor transfer where the water vapor pressure gradient is considered to be the main driving force for such process, the transfer of chlorine dioxide between the donating and receiving solutions is also governed by a similar driving force, i.e. the chlorine dioxide vapor pressure differential. Similarly, as in the case of water vapor transfer, several factors should be considered during the optimization of the chlorine dioxide transfer. The chlorine dioxide vapor pressure and gradient (and resulting flux and transfer rate) can be manipulated by adjusting chlorine dioxide concentration, chlorite concentration and flow characteristics (flow rate, velocity and turbulence) of both donating and receiving solutions as well as the temperatures of both the solutions. Addition of any suitable salt, such as sodium chloride or sulfate as well as pH buffers may also affect the vapor pressure of both chlorine dioxide and water.

The gas membrane material used in the gaseous transfer steps may affect the effectiveness and the rate of the gas transfer. The important features to be considered in this respect are the hydrophobicity of the microporous material, pore size, thickness, chemical stability towards the attack of chlorine dioxide, chlorine, chlorite, chlorate, chloride, acid and base, a so-called "bubble point" (related to a maximum pressure differential between the donating and receiving solutions that can be attained before the contact between both solutions is effected, leading to highly undesired contamination of the receiving solution by the ions present in the donating solution).

Examples of such materials and their characteristics have been described in the aforementioned U.S. Pat. No. 4,683, 039. One material specifically recommended in the above mentioned U.S. patent is expanded polytetrafluoroethylene, which is commercially-available under the trademark "GORE-TEX". Another material which exhibits a satisfactory performance is known as polyvinylidenefluoride (PVDF). Other materials may also be employed. However, at this time, the polytetrafluoroethylene material appears to have a superior performance, especially in terms of its chemical resistance towards the attack of strong oxidizers, such as chlorine dioxide, chlorine and chlorite ions.

The hydrophobic microporous materials can be manufactured in various forms, such as sheets, hollow fibers, tubes and spirals and sealed in the appropriate modules. It is possible to design a module in which an anodic compartment in an electrochemical cell is adjacent to the gas membrane so that the donor compartment of the gas membrane unit and the anode compartment of the electrochemical cell are combined into one, common chamber.

If desired, the content of the cathodic compartment of the electrolytic chlorine dioxide production, comprising mainly aqueous alkali, may be added to the recipient medium, before or after chlorine dioxide treatment. The relatively small volume of catholyte effluent compared to volume of water treated should result in an insignificant change in pH in the treated water. Since the produced hydroxide has many applications in the water treatment facilities, the production of hydroxyl ions by an electroreduction of water is a preferred cathodic reaction. However, any other suitable cathodic reaction may be employed, for example, the electroreduction of oxygen, resulting in a mixture of perhydroxyl and hydroxyl ions and at the same time allowing a lower cell voltage. Perhydroxyl produced in this reaction may be used as a disinfecting agent in water treatment (separately or together with chlorine dioxide) or other suitable application.

The catholyte may comprise also an acidic electrolyte, such as sulfuric acid, sulfurous acid, phosphoric acid, carbonic acid, hydrochloric acid or any other acid, the corresponding salts or their mixtures with acids and/or acid anhydrides. The selection of the cathode material depends on the nature of the catholyte. In general, the cathode materials suitable for alkaline medium, such as, mild steel or nickel, may not be sufficiently resistant against the corrosive attack of acidic electrolytes. In the latter case, the cathode materials such as graphite, lead, lead dioxide, Ebonex®, titanium, tantalum, zirconium, various metalloids, such as metal carbides or nitrides, as well as various noble metals or noble metals coated electrodes, may be employed. It is beneficial to minimize the distance between the cation exchange membrane and the cathode by employing, for example, a so-called zero-gap or a narrow-gap design. Such a design results in a lower cell voltage. When employing a zero-gap cathode design, it is possible to use pure water, preferably free from hardness-forming impurities, as a feed to the cathode compartment. The existing weak caustic solution may be rcirculated, or alternatively, a single pass of water into hydroxide may be employed.

Various pH buffers, such as phosphate, citrate, borate, phthalate, carbonate, acetate, ammonium or other buffers, may also be employed as catholyte solutions. Maintaining the pH of the catholyte below the strongly alkaline range corresponding to the presence of free hydroxide may be beneficial having regard to the minimization of the previously mentioned backmigration of the hydroxyl ions to the anolyte.

Since in most cases the primary reaction occurring at the cathode generates hydroxyl ions via decomposition of water or corresponds to the cathodic discharge of hydrogen ions present in the acidic catholyte, the pH of the catholyte may increase in the course of electrolysis. In such case, it may be beneficial to maintain the pH of the catholyte approximately constant by employing any suitable method, such as acid or acid anhydride (e.g. carbon dioxide) addition, by dilution, by chemical decomposition or by precipitation. The content of the catholyte loop may be continuously or periodically discharged in any suitable manner, either to the sewage or to the treated water. For example, by employing a catholyte containing bicarbonate, carbonate or their mixtures, it is possible to co-produce a very useful by-product, such as soda ash, which is readily applicable in the water treatment facilities, while, at the same time, maintaining the catholyte pH below the strongly alkaline range, so that the concentration of free hydroxyl ions and hence their back-migration to the anolyte is minimized. The rejection of both bicarbonate and carbonate ions by the cation exchange membrane is usually much more efficient than that of hydroxyl ions. The pH of the bicarbonate/carbonate mixture can easily be adjusted by either continuous or periodic addition of carbon dioxide or other acid/acid anhydride. It is also possible to employ a continuous, single-pass (or with recirculation) cathodic process in which bicarbonate or bicarbonate/carbonate mixture is fed to the cathode compartment and the product enriched in carbonate is continuously withdrawn from the compartment.

While using an acidic catholyte, it is possible to utilize the effect of hydrogen ions "leak" to the anolyte through the cation exchange membrane. The extent of the hydrogen ion "leak" may be adjusted to match the quantity of hydroxyl ions entering the anolyte loop with the sodium chlorite feed.

The cathodic reaction may result in the co-production of other useful by-products. For example, a catholyte containing bisulfite or sulfite ions or their mixtures with sulfur dioxide may be utilized for the co-production of sodium dithionite, which is a known bleaching agent.

It is also possible to utilize a special cell design in which the distance between the cathode and the cation exchange membrane is minimized (a so-called "zero-gap" approach), so that a very dilute electrolyte, even water containing very small quantities of ions, resulting for example, from the dissociation of the carbonic acid being in equilibrium with the naturally present, dissolved carbon dioxide, may be employed without requiring an unacceptably high cell voltage. Small additions of any additive which produces ions in water, i.e. acids, bases, salts, acid anhydrides, oxides etc., may be employed, if desired, in order to improve the conductivity of the catholyte.

A so-called "single pass" continuous operation may be employed, whereby the catholyte is not recycled, thus allowing for simplification of the equipment required. It is possible, for example, that the treated water be subjected to cathodic reaction in a once-through system without being recycled.

Similarly to the "zero-gap" approach, a so-called solid polymer electrolyte (SPE) configuration also may be employed, whereby the cathode and/or the anode or both remains in an intimate contact with the cation exchange membrane.

Alternatively to an electrolytic cell equipped cation exchange membrane, a yet another approach can be taken in which the catholyte and the anolyte compartments are separated by means of a conducting ceramic material which preferably allows a specific ionic transfer of sodium ions. Numerous examples of such materials are described in the prior art, e.g. beta-alumina or various ceramic materials described in U.S. Pat. No. 5,290,405. Selectivity of the ceramic material towards the sodium ion transfer is required when sodium chlorite is employed as a source of chlorite ions in the anolyte. However, the utilization of other chlorites, preferably alkali metal or alkali earth metal chlorites, is also possible and, in such a case, the selection of an appropriate ceramic separator allowing an ionic transfer of a desired metal ion may be required.

While a two-compartment electrolytic cell equipped with one separator between the anode and the cathode compartment is preferred for effecting the electrooxidation of chlorite ions to chlorine dioxide, a multicompartment cell containing at least one additional compartment between the cathode and anode compartments also may be employed. A centre compartment so-provided is preferably separated from the adjacent cathode compartment by means of a cation exchange membrane.

The separation of the centre compartment from an adjacent anode compartment may preferably be effected by means of either a cation-exchange membrane or an anion-exchange membrane. In the latter case, the sodium chlorite feed should be directed to the centre compartment from which the chlorite ions and sodium ions resulting from the dissociation of the sodium chlorite are transferred through the anion exchange membrane to the anode compartment and through the cation exchange membrane to the cathode compartment, respectively. The anion-exchange membrane selected for such three-compartment cell should preferably be resistant to the attack of strong oxidizers, such as chlorine dioxide, chlorine and chlorite.

When the three-compartment cell is equipped with two cation exchange membranes the sodium chlorite feed should be directed to the anode compartment, while the centre compartment can be utilized as a buffering compartment preventing penetration of the anode compartment by hydroxyl ions generated in the cathode compartment. Elimination of the hydroxyl ion backmigration to the anode compartment by employing a multi-compartment cell allows to increase the contribution of reaction (1) to the overall current, but at the same time, it is associated with an increased cell voltage and higher cost of the equipment required.

The optimization of the overall process comprising two basic operations, i.e. chlorine dioxide electrogeneration and chlorine dioxide and water vapor transfer through the gas membrane requires careful balancing of process parameters which may differently affect each of above mentioned operations.

For example, the steady state concentration of chlorine dioxide in the anolyte/donating solution, while having positive effect on the rate of gas transfer through the gas membrane, may accelerate chlorine dioxide decomposition reactions to undesired by-products. Chlorine dioxide concentrations may typically be varied between 0.01 gram per liter and 20 grams per liter, preferably 1 to 10 grams per liter. The chlorine dioxide concentration in the receiving solution will typically be lower than in the donating solution.

Chlorite ion concentration in the anolyte/donating solution may affect both the electrochemical cell performance and the gas membrane module operation in several ways. In general, higher chlorite ion concentration results in an increased partial pressure of chlorine dioxide while decreasing the partial pressure of water vapor, thus enhances the transfer rate of chlorine dioxide while decreasing the transfer rate of water vapor. Increased chlorite ion concentration also improves the conductivity of the anolyte thus resulting in a reduction of the cell voltage. This latter effect, i.e. an increase of conductivity may also be achieved by an addition of any suitable electrolyte to the anode compartment. Such electrolyte may be either electrochemically inert, such as, sodium sulfate, nitrate, carbonate, phosphate, perchlorate, etc, or electroactive, such as sodium chloride. Since the mass transport limited current corresponding to reaction (1) is proportional to chlorite ion concentration, higher current densities are generally easier to attain for more concentrated anolytes. On the other hand, however, the decomposition rate of chlorite ions is generally enhanced by increasing chlorite ion concentration.

It is believed that the decomposition of chlorite ion is usually preceded by its protonation in which an unstable chlorous acid intermediate is formed. It is further believed that the source of chlorous acid may be the well-known hydrolysis reaction of chlorite shown in the following equation:

$$ClO_2^- + H_2O \rightleftharpoons HClO_2 + OH^- \qquad (9)$$

The pH of resulting solution can be approximated by the following equation:

$$pH = 7 + \tfrac{1}{2} pKa + \tfrac{1}{2} \log C \qquad (10)$$

where Ka denotes the dissociation constant of chlorous acid (pKa approx. 2) and C denotes the molar concentration of chlorite ions. Using formula (10), it can be shown that, at even moderately concentrated (>1 molar) chlorite ion solution, the "natural" pH is higher than 8. An adjustment of pH to a lower value, such as pH=7, would trigger an approximately ten fold increase in the equilibrium concentration of chlorous acid, which, in turn, may result in an increase of the undesired decomposition of chlorite in which at least one of chlorate ions and chloride ions are formed along with some chlorine dioxide and chlorine. The higher the chlorite ion concentration the more decomposition can be expected upon the adjustment of pH to approximately neutral. The concentration of chlorite ions may also affect the extent of the formation of a complex compound between chlorite ion and chlorine dioxide. The formation of such a complex is described in the prior art as highly undesired. For example, the aforementioned U.S. Pat. No. 4,542,008 teaches that this so-called "mahogany complex" is largely responsible for the undesired decomposition reactions leading to the formation of chlorate, chlorine, chloride and oxygen. The negative impact of this complex can be minimized by lowering the concentrations of chlorite ions and/or chlorine dioxide as well as by minimizing the residence time of the complex and its components in the system. The addition of chemical agents which can interact with the chlorite ions may lead to minimization of the formation of the "mohagany complex" as a result of competing reactions effect.

The "natural" pH value for solutions containing a lower chlorite ion concentration is closer to 7 and hence less decomposition can be anticipated under such conditions. In general, the steady state concentration of chlorite ions should be optimized based on the proper balance of all the above described effects while maintaining the rate of the chlorine dioxide formation corresponding the chlorite oxidation current density at a commercially-acceptable level. The current density standardized on the membrane area is usually in the range between about 0.5 and about 10.0 kA/M$^2$, preferably between about 1 and about 4 kA/m$^2$. Lower concentrations of chlorite ions do not necessarily translate into lower current density attainable, since there are other variables available to manipulate its value. For example, high surface area anodes may be employed for processing of dilute chlorite ion solutions, whereby the conductivity of the anolyte may optionally be enhanced by an addition of any suitable electrolyte. A mass transport limited current may also be varied by manipulating the flow characteristics of the anolyte. When employing a dilute chlorite ion solution as an anolyte, it may be economical to operate the process in a "single pass" mode, whereby the anolyte is not recycled or, alternatively, is recycled only as long as the level of impurities accumulated during the operation is acceptable. In fact, the operation in a "single pass" mode can be optimized for the system employing any practical chlorine dioxide and chlorite ion concentrations. As indicated earlier, both these components, especially when present in "mahogany complex" form, tend to decompose to a greater or lesser extent. From this viewpoint, it is beneficial to minimize the residence time during which both the individual components and the complex coexist in significant concentrations. A "single pass" operation offers a possibility to achieve the residence time minimization. For example, the process can be operated in such a way that the steady-state concentration of chlorine dioxide in the overall system is low, whereby all the chlorine dioxide formed in one pass in the electrochemical cell is "stripped" to this low level in a gas membrane module. By employing such a mode of operation, the only part of the system in which relatively high concentrations of chlorine dioxide and chlorite ions (and thus the "mahogany complex") coexist is that between the electrochemical cell and the gas membrane module. In such an operation, the chlorite feed may be "injected" just before the electrochemical cell in a plug-flow configuration, so that the local concentration of chlorite is enhanced only in the anodic chamber of the electrochemical cell, thus allowing for a higher current density to be attainable. In the electrochemical cell only the injected portion of chlorite is converted to chlorine dioxide, so that in the exiting anolyte the concentration of chlorite is at a steady-state level significantly lower than that inside the anodic chamber of the cell.

Another parameter that requires optimization is temperature. While higher temperatures generally enhance the gas transfer rates as well as reduce the cell voltage, they may also facilitate the rate of undesired decomposition reactions involving either chlorine dioxide or chlorite ions or a combination thereof. Higher temperatures generally also increase the conductivity, thus lowering the cell voltage. The temperature may vary within the system. It may be beneficial to input heat to the system and thus to increase the anolyte's temperature just before the gas membrane module, so that the transfer rates of both chlorine dioxide and water vapor are enhanced. Since the gas transfer module plays also a role of a heat exchanger, the temperature of the solution exiting the module will be lower than that of the solution entering the module. In such a configuration, the temperature in the overall system may be sufficiently low to minimize the decomposition reactions, while it will be elevated only in the gas transfer module, thus allowing higher gas transfer rates at a given composition of the anolyte. Higher gas transfer rates attainable would, in turn, allow the process to operate at lower chlorine dioxide concentrations, which will have a beneficial effect as far as the decomposition reactions are concerned. In principle, given sufficient temperature differential between the donor and the recipient media, it is possible to operate with the chlorine dioxide concentration being lower on the donor side than that on the recipient side.

Yet another variable to be considered during the process optimization is the flow characteristics of the anolyte/donating solution as compared to the flow characteristics of the receiving solution. While it may generally be beneficial to increase the velocity of the anolyte/donating solution from the viewpoint of the mass transport limited current density achievable as well as an enhancement of the gas transfer rate, there may be some limitations associated with gas membrane ability to sustain higher pressures resulting from higher velocities ("bubble point").

Finally, factors affecting the optimum pH in the system were discussed earlier in this application. Since chlorine dioxide is usually stable in the acidic pH range and unstable in the alkaline medium, while chlorite ions are, by contrast, stable in the alkaline pH region but they decompose in the acidic medium, it is generally believed that from the overall stability point of view, the optimum pH should be about neutral. However, the actual pH may vary dependent on the other conditions and parameters. As indicated earlier, the undesired reaction involving chlorine dioxide disproportionation to chlorate and chlorite ions may occur even in the slightly acidic pH range. On the other hand, the chlorite ions in the acidic medium decompose either directly, or through the intermediate "mahogany complex", with the formation of chloride, chlorine dioxide and chlorate. However, from the overall process point of view the most undesired are the decomposition reactions leading to the formation of chlorate, while the other products of decomposition, such as chloride ions, may still be tolerated. This is because chlorate ions constitute a persistent impurity which will accumulate in the anolyte loop, while the chloride ions are not necessarily persistent, because they can be converted to chlorine and escape the system through the gas membrane module. Hence, in a continuous operation, after reaching a certain steady-state level, chloride ions may not accumulate anymore but instead they will be purged from the system at the rate of their formation in the undesired reactions. Furthermore, it is known from the prior art that the presence of chloride ions may in fact inhibit the specific decomposition reaction of chlorite in which chlorate ions are formed, hence minimizing the formation of persistent impurity.

In addition, it is known that chlorine reacts very rapidly with chlorite ions, with the formation of chlorine dioxide and chloride as primary products. It is possible to utilize the above reaction in such a way that sodium chloride is electrolyzed at the anode of a membrane-divided two-compartment cell (a so-called chlor-alkali cell), with the resulting chlorine subsequently being reacted, for example, in a static mixer, with chlorite ions to form chlorine dioxide and chloride ions, the latter ones being recirculated back to the anode compartment of the chlor-alkali cell. In order to achieve a complete conversion of chlorite ions to chlorine dioxide in such a case, it is beneficial to employ an excess of chlorine, which subsequently may be at least partly transferred to the recipient medium in the gas membrane module.

When considering all these factors, the selection of the optimum pH should be based on the minimization of formation of persistent impurities, such as chlorate, and hence the elimination of very specific decomposition reactions. This particular objective may require a pH closer to about 5 rather than 7, the latter being an optimum with respect to the minimization of the decomposition reactions in general, but not necessarily those leading to highly undesired, persistent impurities.

DESCRIPTION OF PREFERRED EMBODIMENT

Referring to the drawings, concentrated sodium chlorite solution is fed by line 10 to a feed tank 12 wherein the sodium chlorite is mixed with recirculated cell liquor to form a sodium chlorite feed stream which is fed by line 14 to an anode compartment 16 of an electrolytic cell 18. For safety reasons, it may be beneficial to minimize the gas space above the solution in the tank, by employing devices such as, for example, a "floating roof". Another possibility would be to use a bladder tank as a feeding device, in which the gas space above the solution would not be able to develop. The cell 18 comprises a cathode compartment 20 separated from the anode compartment 16 by a cation-exchange membrane 22.

In the anode compartment 16, the sodium chlorite undergoes electrolytic oxidation to form chlorine dioxide, while sodium ions are transferred, along with some water, from the anode compartment 16 to the cathode compartment 20 through the cation-exchange membrane 22. An aqueous catholyte is fed to the cathode compartment 20 by line 24, resulting in the formation of an aqueous sodium hydroxide effluent stream in line 26. Alternatively, the sodium hydroxide stream may be recirculated through the cathodic compartment. During the recirculation, any desired concentration of sodium hydroxide may be achieved and maintained, for example, by adding water, as required.

The aqueous solution of chlorine dioxide in the anolyte effluent is removed from the anode compartment 16 and forwarded by line 28 to a gas membrane unit 30. The gas membrane unit 30 contains a microporous, hydrophobic gas membrane 32 dividing the interior of the unit into two compartments 34 and 36 and which permits gaseous vapors to transfer therethrough under suitable driving force. The chlorine dioxide-containing solution in line 28 is received in compartment 34 of the gas membrane unit 30 while water to be treated is fed by line 38 to the other compartment 36.

In view of the difference in the partial pressure of chlorine dioxide on the two sides of the gas membrane, chlorine dioxide is transferred from the chlorine dioxide-containing solution in compartment 34 to the water in compartment 36 by gaseous phase transfer through the membrane 32 so as to treat the water, removed by line 40. While the invention is particularly useful for the treatment by chlorine dioxide of water for consumption, the invention includes the use of chlorine dioxide for the treatment of any aqueous medium, including sewage and other waste water treatments. In addition, the chlorine dioxide may be used in the treatment of non-aqueous medium, for example, in tallow bleaching. Generally, the present invention may be employed in any disinfection, bleaching, sterilization or oxidation application involving chlorine dioxide.

The aqueous phase in compartment 34 preferably is maintained at a higher temperature or pressure than the water in compartment 36 to provide a vapor pressure driving force, as a result of which water vapor is transferred along with the chlorine dioxide through the gas membrane 32 from compartment 34 to compartment 36 (gas phase $ClO_2$, vapor phase delivery).

The residual aqueous phase in compartment 34 containing unreacted chlorite and residual chlorine dioxide is recycled by line 42 to the feed tank 12 for mixing with concentrated sodium chlorite feed in line 10 and the process is repeated. The aqueous alkaline solution in line 26 may be added to the treated water in line 40.

The drawing illustrates a continuous process of effecting water treatment using pure chlorine dioxide, in which steps are taken to effect water extraction from the chlorine dioxide generating process. As mentioned above, using a concentrated (37 wt %) solution feed of sodium chlorite, about 9 moles of water need to be removed for each mole of chlorine dioxide produced.

This water removal is effected by transfer through the cation-exchange membrane 22, generally in an amount of 2 to 5 moles, and by transfer through the gas membrane 32, in an amount of about 4 to 7 moles, or more or less, as required.

Alternatively, vacuum or partial vacuum can be applied to the receiving side in order to facilitate the transfer of chlorine dioxide gas and water vapour. Such a system also may be employed to deliver gaseous chlorine dioxide, optionally in mixtures with water vapour and other diluting gases, such as nitrogen-oxygen or air, if required. A delivery system producing gaseous chlorine dioxide may have application not only to water treatment but also in other areas, such as in the bleaching of pulp, where gaseous chlorine dioxide can be delivered directly to the treated pulp without being previously dissolved in water.

While the two-step removal of water employed in the present invention has been described with respect to the generation of chlorine dioxide electrolytically from sodium chlorite, the principles hereof are applicable to other chlorine dioxide generating processes, for example, those based on chlorate ion reduction, wherein the chlorate ions originate from chlorate salts, chloric acid and mixtures thereof. The processes based on the chlorate ion reduction to chlorine dioxide may involve a variety of both organic and inorganic reducing agents known in the art as well as an electrochemical or catalytic reduction. The preferred processes are those which do not result in a formation of persistent by-products. An example of a reducing agent which, when reacting with chlorate, does not generate any persistent by-products, is hydrogen peroxide. The net reaction between hydrogen peroxide and chlorate ion (chloric acid) can be depicted as:

$$2HClO_3 + H_2O_2 \rightarrow 2ClO_2 + O_2 + 2H_2O \qquad (11)$$

In a combination with the gas membrane module, the chlorine dioxide generator based on hydrogen peroxide addition yields only gas products, namely $ClO_2$, $O_2$, water vapor and, possibly, traces of chlorine which can be conveniently transferred through a suitable hydrophobic, microporous membrane or a combination of several membranes designed and optimized for each gaseous component. The chlorine dioxide generator could operate under vacuum or pressure, depending on the intended use.

The composition of the reaction medium can be optimized to achieve the desired production rate and efficiency. In order to improve the process performance, it may be desirable to operate with the combined feed of chloric acid and alkali metal chlorate, whereby the "deadload" of sodium chlorate affects the rate and efficiency of the reaction while not participating directly in the reaction itself, similarly to the processes described in U.S. Pat. Nos. 5,174,868 and 5,284,553 (Case E438), the disclosures of which are incorporated herein by reference. The mixtures of chloric acid and sodium chlorate can be obtained by any suitable method, for example, by electrochemical acidification, as described in U.S. Pat. Nos. 5,084,148 or 5,122,240, the disclosures of which are incorporated herein by reference. The rate and efficiency of the peroxide based chlorine dioxide generation reaction can be influenced also by the addition of acids other than chloric acid, for example, strong acids, such as sulfuric acid, nitric acid or perchloric acid or a combination thereof. Such an acid can be charged in the initial feed to the generator, but it will not be consumed in the reaction as long as the continuous feed is based on the chloric acid addition. The role of the strong acid other than chloric acid is to enhance the steady-state level of acidity in the generator above that which would result from the addition of chloric acid alone.

Another example of a chlorate based chlorine dioxide generation process in which no persistent impurities are formed is the electrochemical reduction process, similar to that described in U.S. Pat. No. 4,767,510 or U.S. Pat. No. 4,798,715, the disclosures of which are incorporated herein by reference. With the chloric acid feed, optionally in the presence of a "dead load" of sodium chlorate or alternatively, a strong acid presence to enhance the steady-state level of acidity, the reactions can be depicted as:

cathode: $2HClO_3 + 2e^- + 2H^+ \rightarrow 2ClO_2 + 2H_2O$ (12)

anode: $H_2O \rightarrow 2H^+ + \frac{1}{2}O_2 + 2e$ (13)

overall: $2HClO_3 \rightarrow 2ClO_2 + \frac{1}{2}O_2 + H_2O$ (14)

All the gaseous products, namely $ClO_2$, $O_2$ and water vapour can be transferred through a hydrophobic, microporous gas membrane or a combination of membranes. The electrochemical cell can be undivided or, alternatively, may be equipped with a separator, preferably a cation exchange membrane. In the latter case, the anode chamber preferably contains an acidic electrolyte, such a sulfuric acid or perchloric acid. Such a configuration, by preventing the chlorate ions from being in contact with the anode surface, minimizes the possibility of chlorate ions being oxidized at the anode to perchlorate ions.

Yet another example of a chlorate based chlorine dioxide generation process in which no persistent impurities are formed is a catalytic reduction of chloric acid, for example, as described in U.S. Pat. Nos. 4,798,715 and 5,342,601, the disclosures of which are incorporated herein by reference. The reaction in this case can be depicted as:

$HClO_3 \rightarrow 2ClO_2 + \frac{1}{2}O_2 + H_2O$ (15)

Similarly, as in the previous case, all three gaseous components involved in the process, namely $ClO_2$, $O_2$ and water vapour, can be conveniently transferred into a recipient medium through a hydrophobic, microporous gas membrane or a combination of several membranes. In general, all the above described processes would allow the chlorine dioxide generation system to be operated with a very small or essentially no bleed stream since the products from the reaction as well as the water added with the feedstocks would be transferred through the membrane into the recipient medium.

Further, while the present invention has been described with respect to the simultaneous transfer of chlorine dioxide and water vapor to a recipient medium, the principles hereof are applicable to the transfer of other gases, such as chlorine monoxide, hypochlorous acid or chlorine, along with water vapor to a recipient medium. Gases, such as carbon dioxide, oxygen or hydrogen, which may be formed during the operation of the process of the invention can also be removed from the donor medium to the recipient medium, if desired.

EXAMPLE

A plate and frame gas membrane module made using the elements of an Electro Syn cell (Electro Cell AB, Akersberga, Sweden) was evaluated.

The module was comprised of three PVDF frames of 1 cm thickness and dimensions L=53 cm, W=20 cm.

A 51 μm thick membrane made of "GORE-TEX" material (i.e. expanded polytetrafluoroethylene, 40 psig minimum water entry pressure) supported on PVC coated fiberglass scrim was inserted on each side of the center frame. The resulting membrane exposed surface area was 0.08 m².

About 60 L of 10 wt. % $NaClO_2$ solution containing between 2 to 10 g/L $ClO_2$ generated electrochemically was circulated through the module middle compartment at different anolyte flow rates. Water, which constituted the recipient medium, was circulated through the first and third frame in a co-current mode. The recipient medium was continuously monitored for any possible leak of ions from the anolyte through the gas membrane. No measurable leak was observed in any of the experiments.

Samples of anolyte inlet and outlet solutions as well as water exiting the module were analysed for $ClO_2$ content. The drop in $ClO_2$ concentration in the anolyte due to transfer into the water compartments was evaluated using the log mean $ClO_2$ concentration difference, $\Delta ClO_{2LM}$.

$$\Delta ClO_{2LM} = \frac{ClO_{2S1} - [ClO_{2S2} - ClO_{2W2}]}{\ln\left[\frac{ClO_{2S1}}{ClO_{2S2} - ClO_{2W2}}\right]} \quad (16)$$

where:
$ClO_{2S1}$=anolyte inlet $ClO_2$ conc., (mol/cm³)
$ClO_{2S2}$=anolyte outlet $ClO_2$ conc., (mol/cm³)
$ClO_{2W2}$=water outlet $ClO_2$ conc., (mol/cm³)

From these calculations, the chlorine dioxide mass transfer coefficient was calculated using the following equation:

$$K_{ClO_2}(cm/s) = \frac{V_W * ClO_{2W2}}{60\, A_t \Delta ClO_{2LM}} \quad (17)$$

where:
$V_W$=water flow rate, (cm³/min)
$ClO_{2W2}$=water outlet $ClO_2$ conc., (mol/cm³)
$A_t$=mass transfer area based on surface area of gas-liquid contact, (cm²)

In a parallel series of experiments, water vapor transfer from the sodium chlorite solution to the water compartments was evaluated. The system consisted of the same module configuration and membrane material as stated above. Water vapor transfer rates from chlorite solutions at different concentrations and temperatures were evaluated by determining the chlorite solution water loss at different time intervals for specific chlorite solutions/water temperature log mean differences, calculated as:

$$\Delta T_{LM} = \frac{[T_{S1} - T_{W1}] - [T_{S2} - T_{w2}]}{\ln\left[\frac{T_{S1} - T_{W1}}{T_{S2} - T_{W2}}\right]} \quad (18)$$

where:
$T_{S1}$=chlorite sol. inlet temperature, (°C.)
$T_{S2}$=chlorite sol. outlet temperature, (°C.)
$T_{W1}$=water inlet temperature, (°C.)
$T_{W2}$=water outlet temperature, (°C.)

Example 1

In a first series of experiments, the $ClO_2$ mass transfer rate through the membrane as a function of anolyte flow was evaluated for a 10 wt % $NaClO_2$ donating solution (i.e. anolyte) and $H_2O$ as the receiving solution. The variation in K values with increasing anolyte flow may be seen from the results listed in the following Table 1 below:

current efficiency values ranged between 95% and 99% dependent on current density which was varied between 1 and 4 $KA/m^2$. At higher current densities and for a given flow characteristics and chlorite concentration, the contri-

TABLE 1

| Run No. | Water Flow (L/min) | Anolyte Flow (L/min) | Anolyte Temp. (°C.) IN | Anolyte Temp. (°C.) OUT | Water Temp. (°C.) IN | Water Temp. (°C.) OUT | $ClO_2$ conc. (g/L) S1 | $ClO_2$ conc. (g/L) S2 | $ClO_2$ conc. (g/L) W2 | $\Delta ClO_{2LM}$ (mol/cm$^3$) | $K_{ClO2}$ (cm/s) | $ClO_2$ Flux* (g/m$^2$ min) |
|---|---|---|---|---|---|---|---|---|---|---|---|---|
| 1 | 2 | 2   | 23.6 | 21.7 | 5.4 | 8.3 | 4.263 | 4.234 | 0.047 | $6.26 \times 10^{-5}$ | $4.68 \times 10^{-4}$ | 1.1 |
| 2 | 2 | 2   | 23.2 | 21.4 | 5.4 | 8.2 | 4.266 | 4.201 | 0.045 | $6.24 \times 10^{-5}$ | $4.44 \times 10^{-4}$ | 1.1 |
| 3 | 2 | 5   | 23.6 | 22.6 | 3.5 | 7.1 | 4.107 | 4.085 | 0.066 | $6.02 \times 10^{-5}$ | $6.82 \times 10^{-4}$ | 1.6 |
| 4 | 2 | 5   | 23.1 | 22.1 | 3.6 | 7.0 | 4.088 | 4.085 | 0.065 | $6.01 \times 10^{-5}$ | $6.66 \times 10^{-4}$ | 1.6 |
| 5 | 2 | 8.7 | 21.4 | 20.8 | 4.1 | 7.3 | 4.140 | 4.120 | 0.078 | $6.06 \times 10^{-5}$ | $7.96 \times 10^{-4}$ | 1.9 |
| 6 | 2 | 8.7 | 20.8 | 20.2 | 3.7 | 6.9 | 4.091 | 4.088 | 0.077 | $6.01 \times 10^{-5}$ | $7.88 \times 10^{-4}$ | 1.9 |
| 7 | 2 | 16.0| 24.5 | 24.0 | 3.3 | 8.2 | 2.445 | 2.373 | 0.064 | $3.52 \times 10^{-5}$ | $1.12 \times 10^{-3}$ | 2.7 |
| 8 | 2 | 16.0| 23.2 | 22.7 | 3.5 | 7.8 | 2.422 | 2.396 | 0.062 | $3.53 \times 10^{-5}$ | $1.09 \times 10^{-3}$ | 2.6 |

*Calculated $ClO_2$ flux rates normalised for S1 = 4.0 g/L $ClO_2$

Example 2

In a parallel series of experiments, water vapor transfer rates through the membrane material were evaluated using different $NaClO_2$ solution concentrations and $\Delta T_{LM}$ values between the donating and receiving solution, (i.e. $H_2O$).

The results for a 10 wt. % $NaClO_2$ solution are listed in the following Table 2:

TABLE 2

| Run No. | Time (min) | $\Delta T_{LM}$ (°C.) | Water Loss (cm$^3$) | Water Flux (g $H_2O/m^2$ min) |
|---|---|---|---|---|
| 1 | 90 | 9.0  | 58  | 8  |
| 2 | 60 | 9.0  | 40  | 8  |
| 3 | 30 | 15.4 | 61  | 25 |
| 4 | 30 | 15.4 | 62  | 26 |
| 5 | 30 | 20.4 | 92  | 38 |
| 6 | 30 | 20.4 | 93  | 39 |
| 7 | 30 | 24.1 | 119 | 50 |
| 8 | 30 | 24.1 | 115 | 48 |

As can be seen from the comparison of typical fluxes of water and chlorine dioxide expressed in moles/m$^2$ min contained in Tables 1 and 2, the ratio of such fluxes is typically significantly higher than 10:1, thus allowing removal of more water that would have been, otherwise, required when using 37% sodium chlorite feed solution. Hence, less concentrated feed solution may be employed, if desired, without any negative effects on the overall water balance in the process.

Example 3

An electrochemical cell equipped with a graphite or DSA-$O_2$® anode, nickel cathode and Nafion 417 cation-exchange membrane was used to determine the water transfer rates at various concentrations of the anolyte. The number of moles of water transferred per each mole of sodium ions varied from about 3 to 4 for a concentrated anolyte (15 wt. %) to 4 and over for a 10 wt. % or less concentrated anolyte.

The use of a less concentrated anolyte (5 to 10 wt. %) resulted in a very high chemical efficiency in the range of 99 to 100%. The gaseous product contained at least 99.5 wt. % chlorine dioxide and less than 0.5 wt. % chlorine. No measurable quantities of chlorate ions were formed. The bution from the oxygen evolution reaction was generally higher resulting in a decrease in current efficiency.

In experiments involving sodium hydroxide as a catholyte the backmigration effect of hydroxyl ions was determined based on the net production of sodium hydroxide in the cathodic compartment. The loss in cathodic current efficiency, which can be attributed to the hydroxyl ions backmigration through the cation exchange membrane, was found to be in the range of 3 to 5% for 0.1 to 0.2 molar NaOH.

The addition of a concentrated phosphate buffer to the anolyte was found to be a very effective method of minimization or elimination of the chlorate formation effect within the alkaline boundary layer believed to be formed on the side of the cation exchange membrane facing the anode.

The use of a bicarbonate/carbonate mixture as a catholyte resulted in a nearly complete elimination of the backmigration effect from the cathode compartment.

SUMMARY OF THE DISCLOSURE

In summary of this disclosure, the present invention provides a novel procedure for forming chlorine dioxide and utilizing the chlorine dioxide in a beneficial manner. Modifications are possible within the scope of this invention.

What we claim is:

1. A method of forming an aqueous solution of chlorine dioxide, which comprises:
    feeding an aqueous solution of sodium chlorite to an anodic compartment of an electrochemical cell divided by at least one ion-permeable separator from a cathode compartment to which water or an aqueous electrolyte is fed,
    electrochemically generating a first aqueous solution of chlorine dioxide in the anodic compartment of said electrochemical cell in the presence of about 20 to about 450 gpL of sodium chlorate,
    contacting said aqueous solution of chlorine dioxide with one face of a hydrophobic microporous membrane, and
    providing a differential of partial pressure of both said chlorine dioxide and water vapor between said aqueous solution and an aqueous recipient medium in contact with the opposite face of said hydrophobic microporous membrane, whereby both chlorine dioxide and water vapor pass through the membrane to the recipient medium to form a second aqueous solution of chlorine dioxide as the product.

2. The method of claim 1 wherein the sodium chlorate concentration in the anode compartment is about 50 to about 250 gpL.

3. The method of claim 1 including directing a stream of anolyte from said anodic compartment of said electrochemical cell to a cathode compartment of said electrochemical cell and cathodically reducing sodium chlorate to sodium chloride in said cathode compartment.

4. The method of claim 1 including directing a stream of anolyte from said anodic compartment of said electrochemical cell to a cathode compartment to a second electrochemical cell and cathodically reducing sodium chlorate to sodium chloride in said cathode compartment.

5. The method of claim 1 wherein a second electrochemical cell is provided wherein sodium chlorite solution is acidified prior to passage to said anodic compartment of the first-mentioned electrochemical cell.

6. The method of claim 5 wherein effluent from an anodic compartment of the second electrochemical cell is forwarded to the anodic compartment of the first electrochemical cell.

7. The method of claim 1 wherein said sodium chlorite solution is substantially free from impurities.

\* \* \* \* \*